June 19, 1928.
H. ERNST
1,674,506
VALVE FOR PRESERVING RECEPTACLES
Filed April 20, 1927
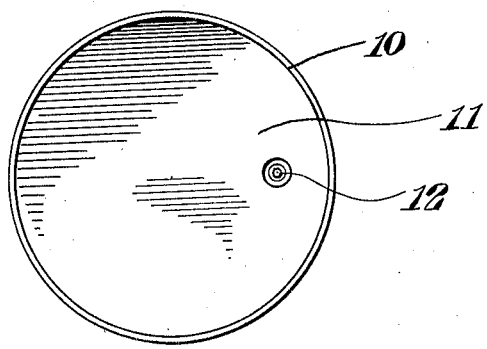
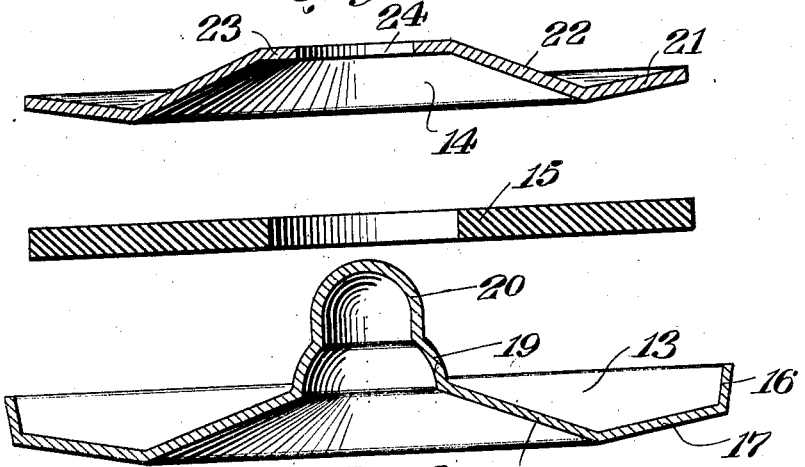
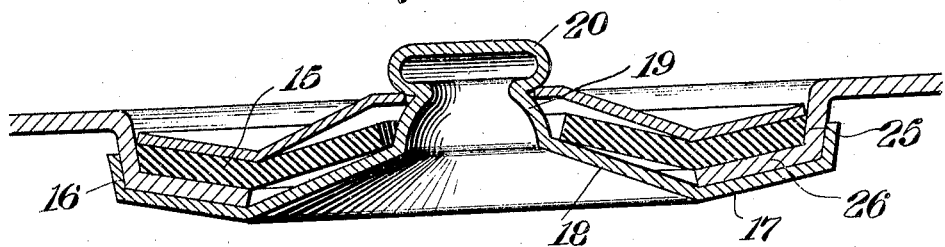
Inventor
Hans Ernst
By his Attorney
Ramsay Hoguet Patented June 19, 1928.

1,674,506

UNITED STATES PATENT OFFICE.

HANS ERNST, OF BARMEN, GERMANY.

VALVE FOR PRESERVING RECEPTACLES.

Application filed April 20, 1927, Serial No. 185,219, and in Germany October 29, 1925.

This invention relates to the preservation of foods in cans or other receptacles, and relates more particularly to a valve to be used in conjunction with preserving receptacles which will permit excessive pressure within such a receptacle to be relieved while preventing ingress of air, whereby the air may be evacuated from such receptacle.

It has long been known that the evacuation of air from a preserving receptacle will improve the keeping qualities of the food. Bacteriologists recognize aerobic and non-aerobic bacteria, i. e., those that require air, or oxygen, for their development, and those that thrive best when oxygen is excluded. Most putrefying bacteria are of the aerobic variety and require oxygen for their development. It has been demonstrated by experiment that aerobic bacteria cease their vital activity after a relatively short time if they are deprived of air. In general, much more air is contained in preserving cans than is assumed to be the case. Thus, it has been ascertained by experiment that about 5½ cu. in. of air escape from a tightly packed 35 oz. can of raw beef during the first few minutes of heating. In the case of vegetables, from 6 to 9 cu. in. of air have been driven off under similar conditions.

The principle of canning, or preserving, is primarily the prevention of the growth of micro organisms. Various means have been employed for this purpose, of which the commonest are sterilization by heat, refrigeration, and chemical agents or preservatives of various kinds. Suitable combinations of these methods have also been employed.

Evacuation has been used to some extent in conjunction with heat, particularly in the canning of ham and other meats, but this operation has heretofore been not only expensive, but troublesome and time-consuming, and has therefore been very little used.

The usual processes of home canning have long been using evacuation unconsciously by heating up the cans in boiling water with the cover loosely applied over the usual rubber gasket, so that the water vapor formed in the cans expels the air, the cans being tightly sealed before being removed from the heating bath. This evacuation is probably the best explanation of the fact that products of good keeping quality are commonly obtained, even with the employment of a sterilization temperature as low as that of the boiling point of water. In support of this assertion that evacuation of air plays an important part in these home-canning processes, it may be noted that if one endeavors to sterilize hermetically sealed cans by the same heat treatment used in these canning processes, the products obtained are usually not of good keeping quality.

It follows from the foregoing that it is possible to get along with lower sterilization temperatures and shorter sterilization periods if the air is removed from the can. Moreover, the lower temperatures and shorter cooking periods have the decided advantage that they do not change the consistency, flavor and color of the food being preserved as much as do the higher temperatures and long heating periods now in common use. Furthermore, long continued heating of proteins at high temperatures causes them to lose a large part of their digestibility and wholesomeness, and in addition is apt to destroy the vitamins, the importance of which has been fully demonstrated by recent scientific research.

According to my invention I have provided a simple, inexpensive means for permitting the utilization of the principle of evacuating the air from a preserving receptacle in commercial practice. My invention attains not only the advantages pointed out above, but other advantages which will be apparent from the following more detailed description.

In the accompanying drawings, which form a part of this specification, and in which like reference characters denote like parts throughout the several views thereof:

Figure 1 is a top plan view of a preserving can having my invention applied thereto;

Figure 2 is a dissembled view of the parts comprising my valve; and

Figure 3 is a central vertical section through a valve according to my invention affixed to a can.

Referring more particularly to the drawings, 10 designates a preserving can of the usual construction, having a top 11, to which is secured my improved valve, denoted generally by the numeral 12. In the specific modification of my invention described and illustrated by way of example, the valve is intended to be affixed to the can top during the manufacture of the can and before the same is filled and sealed in the usual manner.

The valve may obviously be used in connection with either glass or metal preserving receptacles. Of course its most general use is in connection with the ordinary type of metal preserving can in common commercial use.

The valve itself comprises a bottom member 13, a top member 14, and a gasket or washer 15 placed therebetween. The members 13 and 14 are preferably made of sheet metal and may be stamped to the desired shape in large quantities and very economically by the use of the usual and well-known die-stamping machines. The washer 15 is preferably of soft rubber but other suitable material could be substituted.

Member 13 may conveniently be formed with a peripheral flange 16, inclined a little outwardly from the vertical, surrounding a rim 17 which preferably slopes in a slightly downwards direction towards the center of member 13, as shown in the drawings. An upwardly dished intermediate portion 18, an adjoining dome-like section 19, and a central knob 20 surmounting dome 19, complete the member 13.

The upper member 14 is provided with a rim 21 which follows the inclination of the rim 17 of member 13, and with an upwardly inclined intermediate portion 22 which is substantially parallel to the inclination of the portion 18. The central portion 23 of member 14 may be horizontal and is provided with an aperture 24, through which knob 20 is intended to extend.

The top of the can with which my valve 12 is to be used is provided with an apertured depression having a side wall 25 and a rim 26, the conformation of which correspond respectively to the conformation of the portions 16 and 17 of the member 13. The member 13 is placed beneath this depression as shown in Figure 3. The washer 15 is then placed above the rim 25 of the recess in the top of the can, and the member 14 placed on top of the washer. The valve is then fastened together by striking the knob 20 with a suitable punch or drift, thereby flattening out the knob as shown in Figure 3 and clamping the various parts of the valve more or less tightly together, and to the top of the can. It will be observed that the various parts of the valve 12 are so proportioned that the horizontal central portion 23 of member 14 is about the same plane as the junction between knob 20 and dome 19 of member 13.

After the can has been filled with the food to be preserved, and sealed in the usual manner, it is then subjected to the usual process of sterilizing by heating, with the exception that, as above stated, the temperature used may be lower and the duration of the heating may be shorter. During this heating the air in the can will expand, and, if the product being canned is moist, water vapor will be formed, all of which will increase the pressure within the can above atmospheric. During this operation the air will be permitted to escape from the can through my valve, the path of the air being between the lower member 13 and the side wall 25 and rim 26 of the recess, through the central aperture of the washer 15, and out through the aperture 24 around the edge of the flattened knob 20. It will be noted that the joints between the member 13 and the edges 25 and 26 of the recess, and between the flattened knob 20 and the top member 14, are not intended to be made absolutely tight by the mere operation of clinching the parts of the valve together.

When the heating of the can is completed the resulting drop in temperature causes a lowering of the pressure within the can, but my valve is so constructed that it will not permit air to enter even though pressure outside of the can exceed that within, for the reason that any excess of pressure outside of the can will cause the rubber gasket 15 to become flattened against the portion 18 of the lower member 13, and thus to effectually seal the joint between the rim 26 and the member 13. In other words, the rubber gasket 15 acts very much as a flap valve.

It is apparent that my valve is well adapted to large-scale canning industries. The manner of filling and sealing the preserving cans is not changed, but may be effected in the well-known manner and with the machines hitherto in use. The valve does not project from the cover of the can to any great extent, either from the inside or toward the outside, and hence is not in the way. The diameter of the valve is only 6/10ths of an inch in its preferred form, and the depth is only 1/10 inch. The valve has no visible opening on the outside, which prevents interference by curious persons, and also has no unprotected opening on the inside, thereby preventing contact of the sealing washer with the contents of the can. Furthermore, the construction of the valve is such that it cannot be damaged by rough handling of the can, and it is absolutely positive in its operation. The construction is so simple that it increases the cost of the preserving can but very little, and the economies effected by the shortening of the heating operation and the improved quality of the food being preserved, more than compensate for this additional expense. Furthermore, the operation of my valve presents a great advantage over evacuation processes as formerly used in that previously the cans were evacuated before sterilizing and any gases developing during cooking perforce remained in the can, whereas with my valve they are permitted to escape. In preserving many classes of food this is of the greatest importance since these gases frequently have an injurious effect on the walls of the cans.

It might be supposed that the contents of the can would be permitted to boil dry during sterilization by the operation of the valve. This, however, is not the case because there must be a considerable excess of pressure within the can over atmospheric in order to open the valve, and this excess pressure of course represents water vapor which will be retained upon cooking.

Other advantages of my improved valve are that it is no longer necessary to fill the can to the top with fat or gravy in canning fried foods, as was formerly necessary. This results in a great saving of fat and also improves the flavor of the food and preserves its character as a fried canned food rather than making it resemble a food boiled in fat or gravy.

Other advantages and applications of my improved can valve will be apparent to those skilled in the art of preserving foods, and it will be obvious that many changes or modifications might be made without affecting the spirit of my invention.

I desire to be limited therefore only by the prior art and scope of the appended claims.

I claim:

1. In combination with a receptacle for preserving foods, a valve comprising a valve seat, a flexible sealing member seated thereon and having a central aperture, a cover disposed on said sealing member and located outside of said receptacle, said cover being spaced from the central portion of said sealing member to permit displacement thereof by excessive pressure within said receptacle, and means including a projection on said valve seat extending through the aperture of said sealing member for securing said cover to said seat and for clamping the periphery of said sealing member therebetween, the joint between said projection and said cover being located outside of said receptacle and beyond the valve.

2. In combination with a receptacle for preserving foods, a valve comprising a metallic valve seat, a flexible sealing member seated thereon and having a central aperture, a cover disposed on said sealing member and located outside of said receptacle, said cover being spaced from the central portion of said sealing member to permit displacement thereof by excessive pressure within said receptacle, an integral rivet on said seat extending through the aperture of said sealing member, and a head on said rivet for securing said cover to said seat and for clamping the periphery of said sealing member therebetween, said head being located outside of said receptacle and beyond the valve.

3. In combination with a receptacle for preserving foods, a valve comprising a metallic valve seat, a flexible sealing member seated thereon and having a central aperture, a cover disposed on said sealing member and located outside of said receptacle, said cover being spaced from the central portion of said sealing member to permit displacement thereof by excessive pressure within said receptacle, an integral hollow rivet formed on said seat extending through the aperture of said sealing member, said seat having a conical raised portion surrounding said hollow rivet to press said sealing member upward and increase its pressure against said seat, and a head on said rivet for securing said cover to said seat and for clamping the periphery of said sealing member therebetween, said head being located outside of said receptacle and beyond the valve.

4. In combination with a receptacle for preserving foods having an aperture in a wall thereof, a valve adapted to close said aperture against ingress of air comprising a lower member seated against the inner side of said wall, a flexible sealing member having an aperture registering with the aperture in said wall and seated upon the outer side of said wall, an upper member seated upon said flexible sealing member and spaced therefrom adjacent the aperture thereof, and means passing through said registering apertures for clamping the periphery of said sealing member between said can wall and said upper member while permitting displacement of the central portion of said sealing member from its seat against said lower member by excessive pressure within the receptacle the joint between said means and said upper member being located outside of said receptacle and beyond said sealing member.

5. In combination with a receptacle for preserving foods having an aperture in a wall thereof, a valve adapted to close said aperture against ingress of air, comprising a lower member seated against the inner side of said wall and having a central portion projecting through said aperture, a flexible sealing member surrounding said projecting portion and seated upon the outer side of said wall, and an upper member also surrounding said projecting portion and having its periphery seated upon the periphery of said sealing member, the intermediate portion of said upper member being spaced from said sealing member, and said projecting portion being adapted to clamp the periphery of said sealing member between said can wall and said upper member while permitting displacement of the central portion of said sealing member from its seat against said lower member by excessive pressure within the receptacle, the joint between said projecting portion and said upper member being located outside of said receptacle and beyond said sealing member.

6. In combination with a receptacle for preserving foods having an aperture in a wall thereof, a valve adapted to close said aperture against ingress of air, comprising a metallic valve seat seated against the inner side of said wall and having an integral centrally located hollow rivet projecting through said aperture, a flexible sealing member surrounding said hollow rivet and seated upon the outer side of said wall, a metallic cover also surrounding said hollow rivet and having its periphery seated upon the periphery of said sealing member, the intermediate portion of said cover being spaced from said sealing member, and a head formed on said hollow rivet adapted to clamp the periphery of said sealing member between said can wall and said cover while leaving the intermediate portion of said sealing member free to be displaced from its normal position against said valve seat by excessive pressure within the receptacle.

In testimony whereof, I have signed my name to this specification this 1st day of April, 1927.

HANS ERNST.